United States Patent
Dain et al.

(10) Patent No.: US 11,755,592 B2
(45) Date of Patent: Sep. 12, 2023

(54) DATA SEARCH WITH AUTOMATED SELECTION OF ARTIFICIAL INTELLIGENCE INFERENCE MODELS AND INFERENCE LABEL INDEXING

(71) Applicant: INTERNATIONAL BUSINESS MACHINES CORPORATION, Armonk, NY (US)

(72) Inventors: Joseph W. Dain, Vail, AZ (US); Frank N. Lee, Sunset Hills, MO (US); Nilesh Prabhakar Bhosale, Pune (IN); Christopher Vollmar, Mississauga (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 119 days.

(21) Appl. No.: 17/411,471

(22) Filed: Aug. 25, 2021

(65) Prior Publication Data

US 2023/0061011 A1   Mar. 2, 2023

(51) Int. Cl.
  *G06F 16/2457* (2019.01)
  *G06F 16/248* (2019.01)
  *G06N 5/04* (2023.01)

(52) U.S. Cl.
  CPC ...... *G06F 16/24573* (2019.01); *G06F 16/248* (2019.01); *G06F 16/24578* (2019.01); *G06N 5/04* (2013.01)

(58) Field of Classification Search
  CPC ......... G06F 16/24573; G06F 16/24578; G06F 16/248; G06N 5/04
  See application file for complete search history.

(56) References Cited

U.S. PATENT DOCUMENTS

| | | | | |
|---|---|---|---|---|
| 5,301,260 A * | 4/1994 | Miyashita | ............... | G06N 5/046 706/50 |
| 7,296,256 B2 * | 11/2007 | Liu | ........ | G06Q 10/04 717/149 |
| 10,658,071 B2 | 5/2020 | Do et al. | | |
| 11,361,857 B2 * | 6/2022 | Sudharsan | ............... | G06N 5/04 |
| 11,482,027 B2 * | 10/2022 | Gupta | .................... | G06Q 10/10 |

(Continued)

FOREIGN PATENT DOCUMENTS

| | | |
|---|---|---|
| CN | 103761304 | 4/2014 |
| CN | 109002744 | 12/2018 |

(Continued)

*Primary Examiner* — Jorge A Casanova
(74) *Attorney, Agent, or Firm* — KONRAD RAYNES DAVDA & VICTOR LLP; Janaki K. Davda

(57) ABSTRACT

Provided are techniques for data search with automated selection of one or more AI inference models and inference label indexing. Metadata for a data object that is stored in a data source is retrieved. The metadata is matched to filtering criteria. The filtering criteria is used to identify an Artificial Intelligence (AI) inference model. The data object is sent to an inference engine for the AI inference model. An inference result is received from the inference engine. The inference result is stored in a database to associate the inference result with the data object. Then, in response to receiving a search request with one or more terms, the one or more terms are matched to the inference result in the database. and the data object and the inference result are returned.

17 Claims, 11 Drawing Sheets

(56) References Cited

U.S. PATENT DOCUMENTS

| | | | |
|---|---|---|---|
| 11,522,703 B1* | 12/2022 | Jain | G06F 21/6245 |
| 2009/0240647 A1* | 9/2009 | Green | G06N 7/01 |
| | | | 706/52 |
| 2014/0195472 A1* | 7/2014 | Kawagishi | G16Z 99/00 |
| | | | 706/46 |
| 2017/0193072 A1* | 7/2017 | Vase | G06N 7/01 |
| 2017/0329820 A1* | 11/2017 | Park | G06F 16/248 |
| 2018/0197105 A1* | 7/2018 | Luo | G06F 16/355 |
| 2020/0027210 A1 | 1/2020 | Haemel et al. | |
| 2020/0242487 A1 | 7/2020 | Jain et al. | |
| 2020/0364588 A1* | 11/2020 | Knox | H04L 67/565 |
| 2021/0081720 A1* | 3/2021 | Polleri | G06F 18/10 |
| 2021/0224684 A1* | 7/2021 | Sarkar | G06F 3/0638 |
| 2022/0345234 A1* | 10/2022 | Morris | G11B 27/031 |

FOREIGN PATENT DOCUMENTS

| | | |
|---|---|---|
| CN | 109886204 | 6/2019 |
| CN | 111599165 | 8/2020 |
| WO | 2021022962 | 2/2021 |

* cited by examiner

Event Message

Database Record

US 11,755,592 B2

DATA SEARCH WITH AUTOMATED SELECTION OF ARTIFICIAL INTELLIGENCE INFERENCE MODELS AND INFERENCE LABEL INDEXING

BACKGROUND

Embodiments of the invention relate to a computer program product, system, and method for data search with automated selection of one or more Artificial Intelligence (AI) inference models and inference label indexing. Additional embodiments of the invention relate to a computer program product, system, and method for event-based automated AI inference pipeline, catalog, and search.

Data objects in a large-scale storage environment may be stored in distributed storage systems. As data is generated and modified at ever increasing rapid speeds and the amount of data exponentially increases, the computational efforts to process data for searching likewise increases.

An inference model may be described as a machine learning model. The inference model may be trained and then used to make predictions.

Today, customers are able to build inference models and they are able to ingest different data, including Internet of Things (IOT) data. IOT data may be described as data from a network of physical devices ("things") that may have sensors for collecting data and software for connecting, via the Internet, with devices and other computing systems and exchanging the data.

SUMMARY

In accordance with certain embodiments, a computer program product is provided for data search with automated selection of one or more AI inference models and inference label indexing. The computer program product comprises a computer readable storage medium having program code embodied therewith, the program code executable by at least one processor to perform operations. Metadata for a data object that is stored in a data source is retrieved. The metadata is matched to filtering criteria. The filtering criteria is used to identify an Artificial Intelligence (AI) inference model. The data object is sent to an inference engine for the AI inference model. An inference result is received from the inference engine. The inference result is stored in a database to associate the inference result with the data object. Then, in response to receiving a search request with one or more terms, the one or more terms are matched to the inference result in the database. and the data object and the inference result are returned.

In accordance with other embodiments, a computer system is provided for data search with automated selection of one or more AI inference models and inference label indexing. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. Metadata for a data object that is stored in a data source is retrieved. The metadata is matched to filtering criteria. The filtering criteria is used to identify an Artificial Intelligence (AI) inference model. The data object is sent to an inference engine for the AI inference model. An inference result is received from the inference engine. The inference result is stored in a database to associate the inference result with the data object. Then, in response to receiving a search request with one or more terms, the one or more terms are matched to the inference result in the database. and the data object and the inference result are returned.

In accordance with yet other embodiments, a computer-implemented method is provided for data search with automated selection of one or more AI inference models and inference label indexing. The computer-implemented method comprises operations. Metadata for a data object that is stored in a data source is retrieved. The metadata is matched to filtering criteria. The filtering criteria is used to identify an Artificial Intelligence (AI) inference model. The data object is sent to an inference engine for the AI inference model. An inference result is received from the inference engine. The inference result is stored in a database to associate the inference result with the data object. Then, in response to receiving a search request with one or more terms, the one or more terms are matched to the inference result in the database. and the data object and the inference result are returned.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
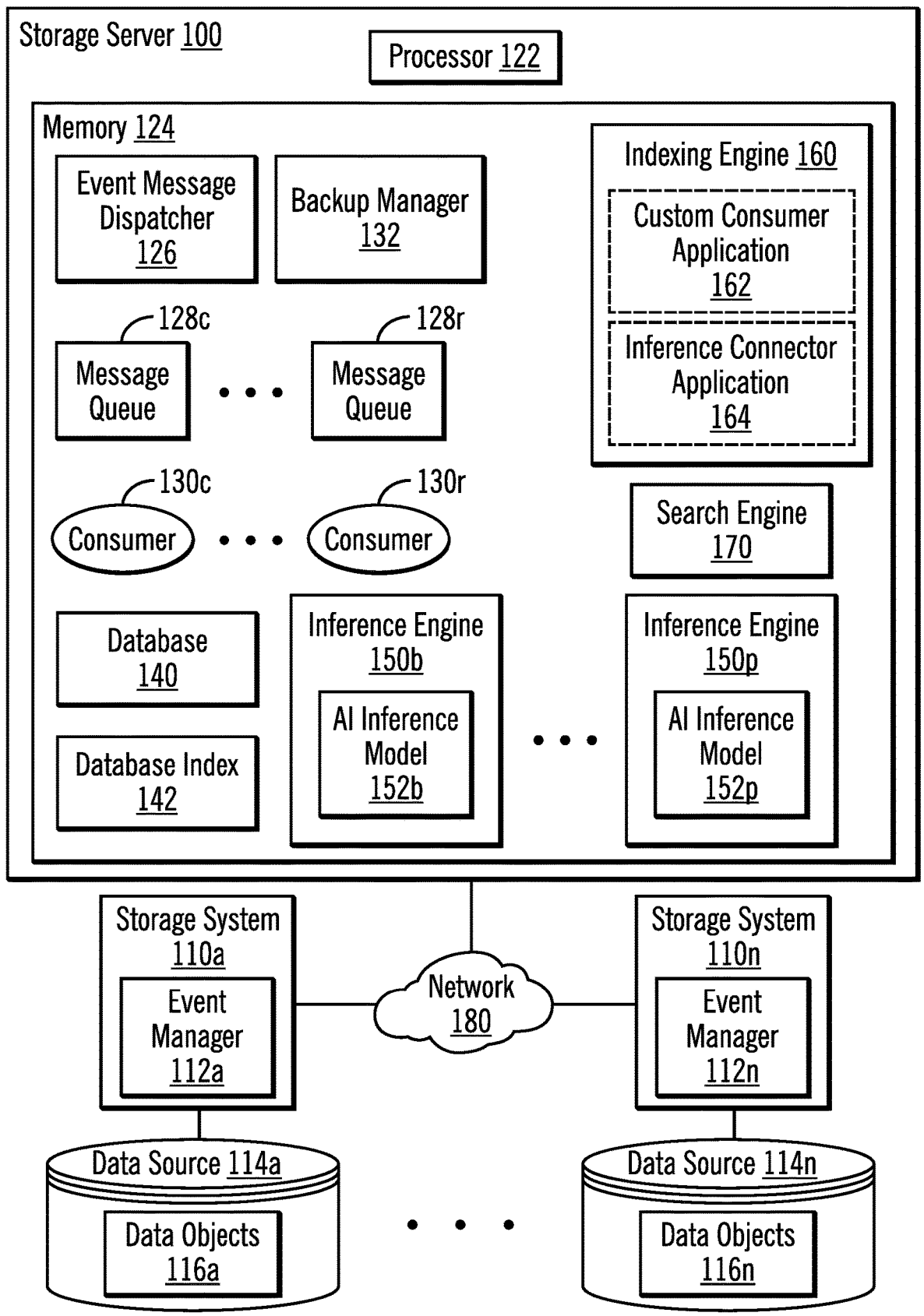
FIG. 1 illustrates a storage environment including a storage server in accordance with certain embodiments.

FIG. 1 illustrates an embodiment of a storage environment including a storage server 100. The storage server 100 is coupled, via a network 180, to storage systems 110a . . . 110n. The storage server 100 includes an event message dispatcher 126, message queues 128c . . . 128r, and consumers 130c . . . 130r. Each of the consumers 130i may be associated with one or more of the queues 128c . . . 128r.

In addition, the storage server 100 includes at least one database 140 with an associated database index 142. Moreover, the storage server 100 includes inference engine 150b . . . 150p, and each inference engine 150b . . . 150p includes an AI inference model 152b . . . 152p. Also, the storage server includes an indexing engine 160 and a search engine 170. The indexing engine 160 may be implemented as a custom consumer application 162 or as an inference connector application 164 in alternative embodiments.

The storage systems 110a . . . 110n may be host computers, servers, IoT devices, etc. There may be any number of storage systems 110a . . . 110n in various embodiments. Each of the storage systems 110a . . . 110n includes an event manager 112a . . . 112n. Each of the storage systems 110a . . . 110n is coupled to a data source 114a . . . 114n. Each data source 114a . . . 114n is a storage (i.e., physical storage or data store) that stores data objects 116a . . . 116a.

The storage server 100 receives event messages 200 (FIG. 2) from the storage systems 110a . . . 110n. The event messages are generated when a storage system 110a . . . 110n determines that there is an update to a data object 116a . . . 116n. The update to a data object 104 may comprise deleting of an existing data object, a modification of an existing data object or adding of a new data object. A data object 116a . . . 116n may comprise a file, a database object, logical blocks, volumes, chunks, extents or any other storage unit in which data may be separately manipulated and addressed.

An event manager 112a . . . 112n at a storage system 110a . . . 110n creates and sends event messages 200 to the storage server 100 upon the storage system 110a . . . 110n processing an update to a data object 116a . . . 116n (e.g., in real-time before the update is applied). In this way, the storage server 100 receives event messages 200 (FIG. 2) on updates to data objects 116a . . . 116n immediately in real-time when the changes are made, and, in certain embodiments before the changes are applied.

The storage server 100 includes a processor 122, which represents one or more processor devices, and a memory 124 having program code executed by the processor 122, including an event message dispatcher 126 to process event messages 200 from an event manager 112a . . . 112n and to add the received event message 200 to one or more message queues 128c . . . 128r in the memory 124. For instance, there may be a message queue 128c . . . 128r for each data source 114a . . . 114n. An event message 200 for an update to a data object 116a . . . 116n is added to the message queue 128c . . . 128r for the data source 114a . . . 114n having the updated data object 116a . . . 116n. The memory 124 may further include one or more consumers 130c . . . 130r to process event messages 200 in one or more of the message queues 128c . . . 128r to convert the information on an updated data object in an event message 200 to a database record 300 (FIG. 3) to store in a database.

The event manager 112a . . . 112n may generate an event message 200 immediately upon receiving the update to the data object 116a . . . 116n and before the update is applied. In this way, the event messages 200 provide real time information on updates to the data objects 104 to the storage server 100 so that the database has current information on changed data objects 116a . . . 116n.

Upon receiving an event message 200, the event message dispatcher 126 adds the event message 200 to an event message queue 128c . . . 128r. The event message queue 128c . . . 128r may be selected based on workload load balancing to evenly distribute messages 200 among the message queues 128c . . . 128r or having data sources 114a . . . 114n assigned to message queues 128c . . . 128r, so an event message 200 is added to the message queue 128c . . . 128r associated with the data source 114a . . . 114n in which the data object 116a . . . 116n of the event message is stored.

There may be any number of message queues 128c . . . 128r and consumers 130c . . . 130r to process the message queues 128c . . . 128r where consumers 130c . . . 130r may process requests from one or more of the message queues 128c . . . 128r.

The database 140 may comprise a No Structured Query Language (No SQL) database, an SQL database, a relational database, objected oriented database, Extended Markup Language (XML) database, and any other suitable database known in the art.

The data sources 114a . . . 114n may be implemented in different types or classes of storage devices, such as magnetic hard disk drives, magnetic tape storage, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Storage arrays may further be configured ranks in the storage devices, such as Just a Bunch of Disks (JBOD), Direct Access Storage Device (DASD), Redundant Array of Independent Disks (RAID) array, virtualization device, etc. Further, the storage devices implementing the data sources 114a . . . 114n may comprise heterogeneous storage devices from different vendors and different types of storage devices, such as a first type of storage devices, e.g., hard disk drives, that have a slower data transfer rate than a second type of storage devices, e.g., SSDs.

The memory 124 may comprise a suitable volatile or non-volatile memory devices, including those described above.

Figure 2:
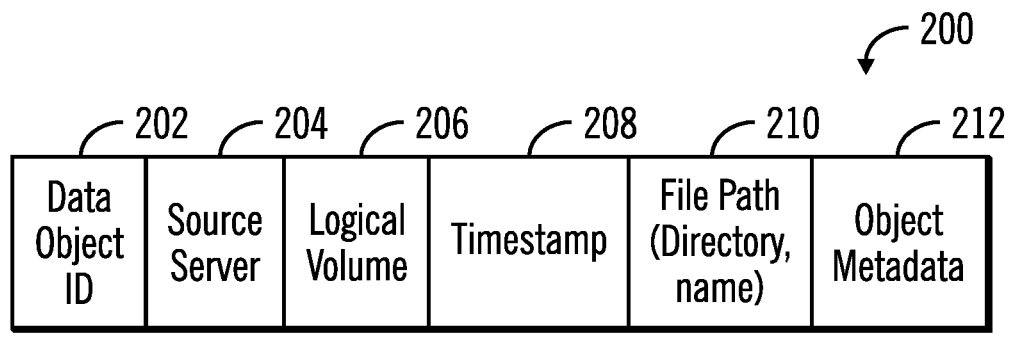
FIG. 2 illustrates an instance of an event message generated by an event manager to provide to the storage server in accordance with certain embodiments.

FIG. 2 illustrates an embodiment of an instance of an event message 200 generated by an event manager 108 to provide to the storage server 100. The event message 200 includes a data object ID 202 identifying a data object; a source server 204 managing the data source including the data object; a logical volume 206 configured in the data source in which the data object is stored, e.g., logical unit number (LUN), volume, logical drive, etc.; a timestamp 208 indicating a time the data object was created and/or last modified; a file path 210, such as a directory name, including the data object 202; and object metadata 212 for the data object. In certain embodiments, the object metadata 112 indicates a type of data object, the application that created the data object, information on the user that invoked the application to create the data object, a data source identifier (e.g., a file system identifier of a file system of the data source), a path to the data object in the data source (e.g., a file system path to the data object), and one or more inference results. Each inference result may include an inference label (that waw identified by an AI inference model), and an accuracy of that inference label. In certain embodiments, the inference label is a class or classification. In various embodiments, the accuracy may be a percentage value (e.g., 50% accurate), may be a numeric value (e.g., accuracy is 5 out of a range of 1-10), etc.

Figure 3:
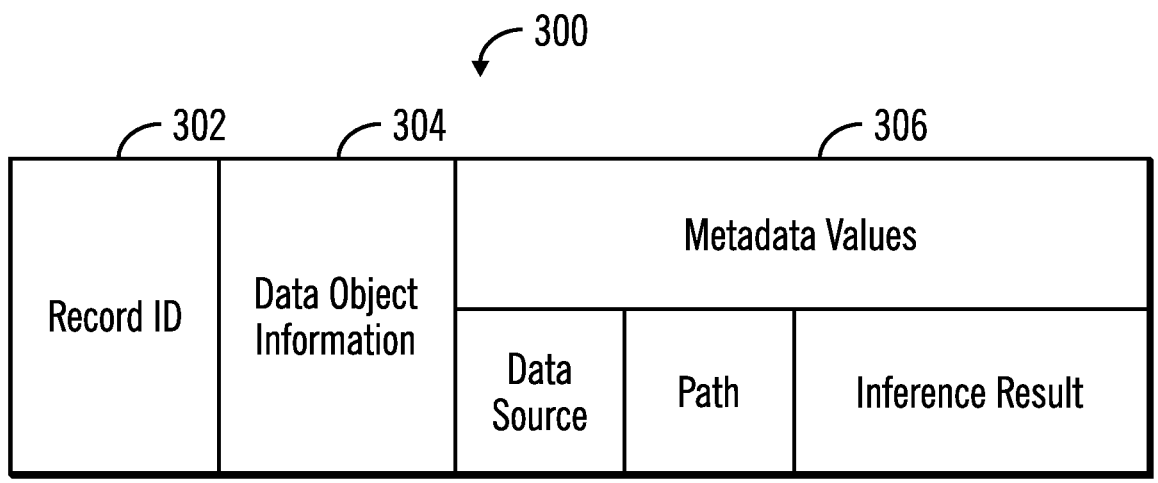
FIG. 3 illustrates an embodiment of a database record in the database in accordance with certain embodiments.

FIG. 3 illustrates an embodiment of a database record 300 in the database and includes a record identifier (ID) 302 identifying the database record 300 in the database, data object information 304, which may comprise all or some of the information in the event message 200 in fields of the database record 300, and metadata values 306. The metadata values 306 include: a data source identifier (e.g., a file system identifier of a file system of the data source), a path to the data object in the data source (e.g., a file system path to the data object), and an inference result. The inference result may include one or more inference labels (that were identified by one or more AI inference models) and an accuracy of each of the inference labels. The database may also include an index to allow fast searching of records based on any combination of the inference label, the accuracy, and other relevant backup key/value pairs, such as the time the database object was last updated, data type, source data set, etc.

In certain embodiments, the indexing engine 160 scans the data objects 116a . . . 116n that already exist in the one or more data sources 114a . . . 114n followed by instrumenting the storage systems 110a . . . 110n to send real time event messages about which data objects (e.g., files and other objects) are accessed and modified in the storage systems 110a . . . 110n. The event messages are indexed into a persistent and searchable location (e.g. a structured database, a not only Structured Query Language (no-SQL) database, a semi-structured implementation (e.g., such as a hybrid SQL and Hadoop database or an Apache Spark® Module for Structured Data Processing (Spark SQL) with JavaScript® Object Notation (JSON) format, Apache Parquet® format or some other semi-structured object/file format). (JavaScript is a registered trademark of Oracle Corporation in the United States and/or other countries.) (Apache Spark and Apache Parquet are a registered trademark of the Apache Software Foundation (ASF)).

With embodiments, a job (initiated by the indexing engine 160) is triggered based on the live event message, and the job reads the data object from the storage system 110a . . . 110n and passes the data object to one or more AI inference models in near real time in a highly scalable and high performance fashion. This enables previously unattainable levels of scalability for production inferencing and cataloging AI solutions.

Figure 4:
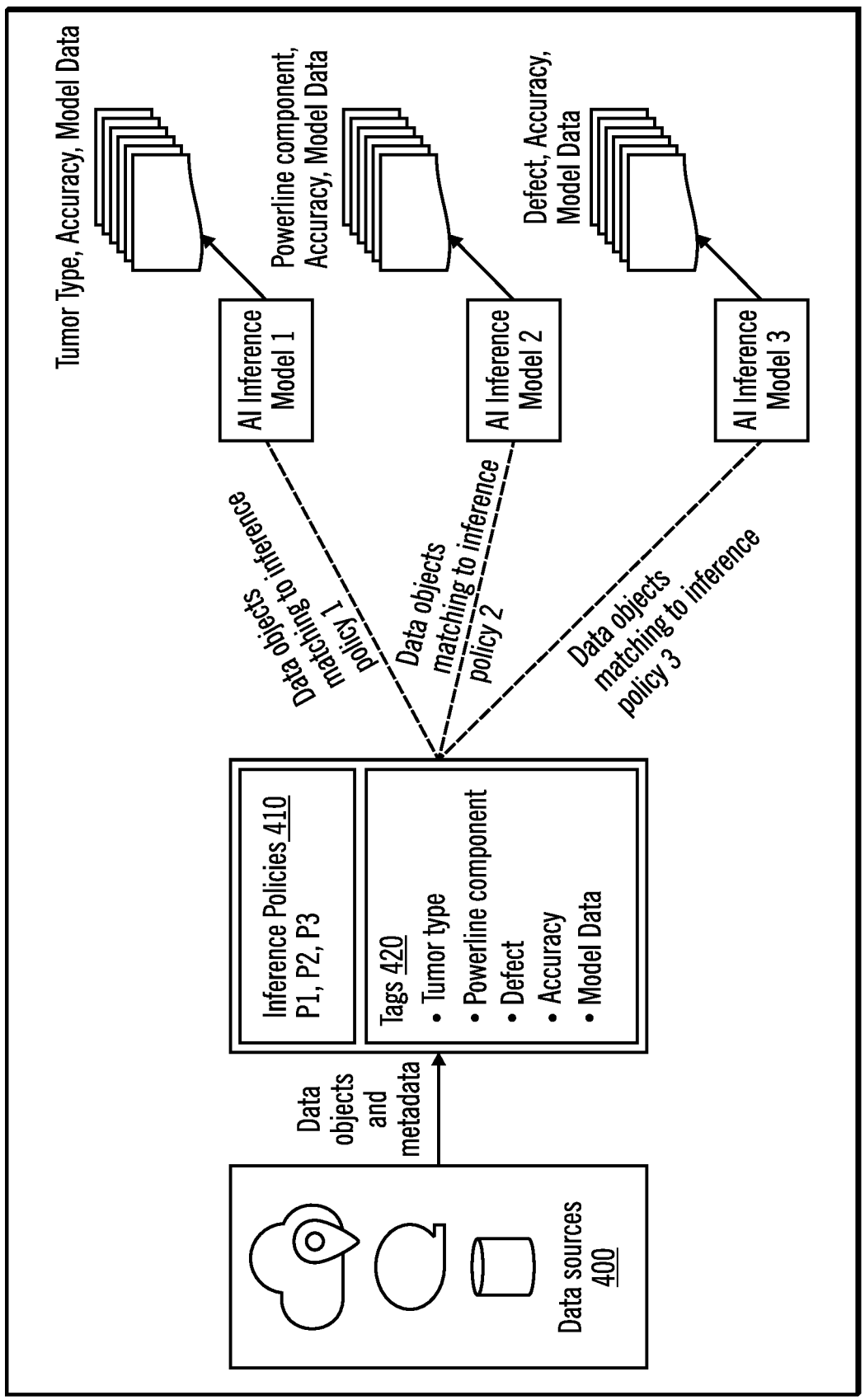
FIG. 4 illustrates an event-driven, automated AI inference pipeline in accordance with certain embodiments.

FIG. 4 illustrates an event-driven, automated AI inference pipeline in accordance with certain embodiments. Data sources 400 include data objects and metadata. Tags 420 are associated with inference policies 410. The metadata from the data sources 400 are matched to the tags 420, and the matched tags 420 are used to identify one or more associated inference policies 410. In certain embodiments, filtering criteria is matched to an inference policy that identifies an AI inference model from multiple AI inference models. The filtering criteria may be metadata, one or more tags or any combination of metadata and one or more tags, where the one or more tags may be custom metadata. Then, data objects matching to inference policy 1 is routed to AI inference model 1; data objects matching to inference policy 2 is routed to AI inference model 2; and data objects matching to inference policy 3 is routed to AI inference model 3. For each of the data objects, AI inference model 1 outputs a tumor type based on the data object, an accuracy of the tumor type, and a model data. In certain embodiments, the model data includes a unique identifier and a version for an AI inference model. For each of the data objects, AI inference model 2 outputs a powerline component based on the data object, an accuracy of the powerline component, and a model. For each of the data objects, AI inference model 3 outputs a defect based on the data object, an accuracy of the defect, and a model.

With reference to FIG. 4, the indexing engine 160 catalogs data objects from multiple data sources (e.g., storage islands) and matches the metadata of those data objects to one or more inference policies that determine whether a new data object should be sent to an AI inference model for further inspection. The results of the AI inference model, along with the AI inference model description, and the accuracy results of the AI inference model are automatically catalogued into the database.

The results from the AI inference model may also be inspected to determine whether additional inferencing is needed. For example, if the results of AI inference model 1 indicate a tumor is malignant, the data object may be sent to a secondary AI inference model for further processing.

Figure 5:
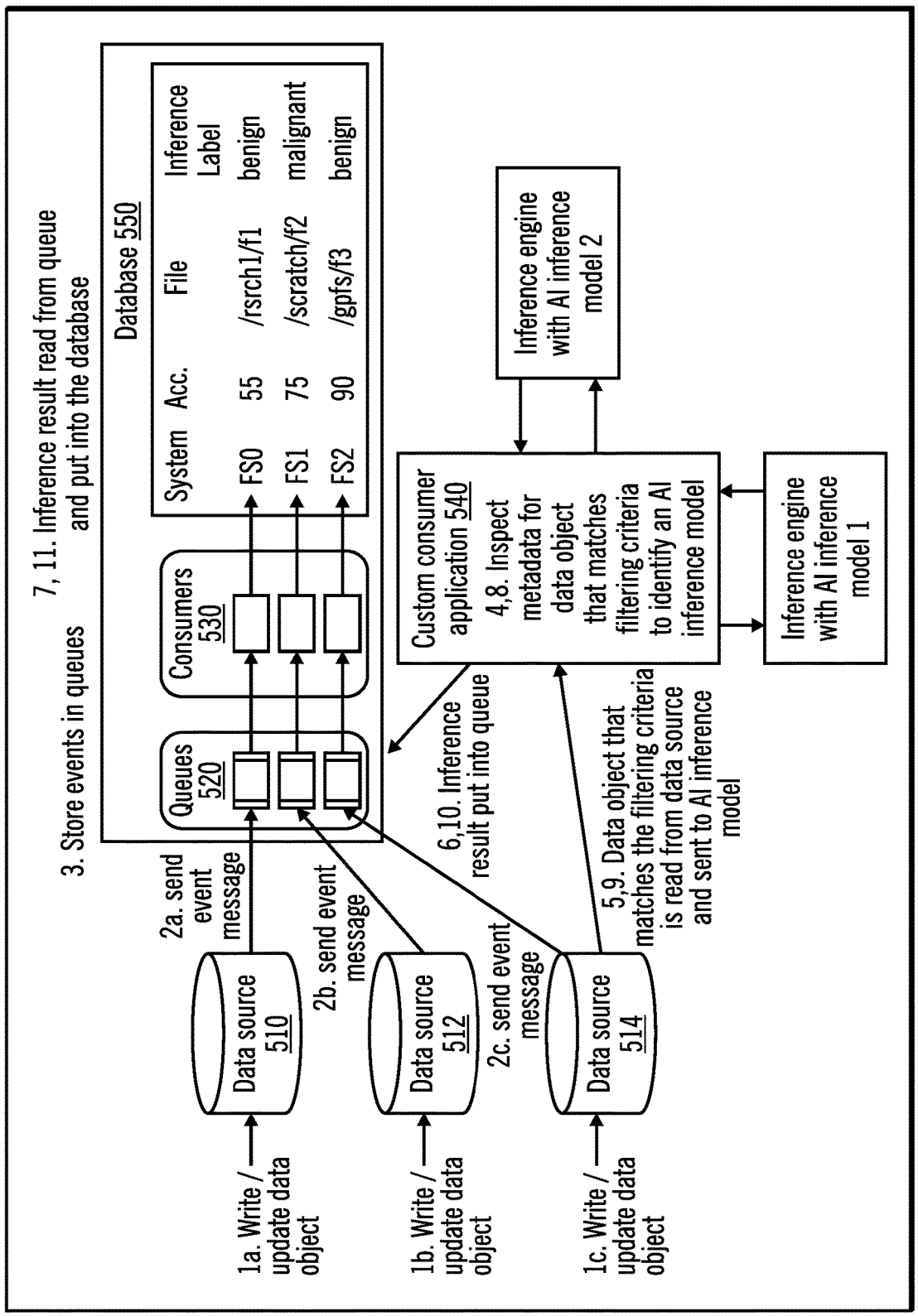
FIG. 5 illustrates automated inference label indexing with event messages and consumers in accordance with certain embodiments.

FIG. 5 illustrates automated inference label indexing with event messages and consumers in accordance with certain embodiments. In certain embodiments, with reference to FIG. 5., at operation 1, applications or users update (e.g., write) data objects (e.g., files or other objects) to file systems of data sources 510, 512, 514 that store the data objects. In operation 2, the storage systems send event messages containing the metadata about the data objects. These event messages are put onto persistent message queues 520, and consumers 530 read the event messages from the queues 520, normalize the event messages, and insert the content of the event messages into a database table 550 (operation 3). In operation 4, a consumer custom application 540 also reads each event message from the queues 520.

For an event message, the consumer custom application 540 matches the metadata of the event message for a data object to filtering criteria, which is matched to an inference policy that identifies an AI inference model. If the filtering criteria is met, the data object is read from the data source and sent to an inference engine that includes an AI inference model (identified by the inference policy). In this example, the filtering criteria is met, and the custom consumer application 540 reads the data object for the event message from the data source and sends the data object to an inference engine that includes AI inference model 1 in operation 5, and the inference result is put onto a queue in operation 6. In certain embodiments, the inference result is put into a new event message onto the queue. In this example, the inference result is an inference label and an accuracy of that inference label. The queue may be the same queue that stored the event message that was read or may be a different queue.

In operation 7, the inference result is read from the queue and inserted into the database 550. In alternative embodiments, the inference result may be directly inserted into the database 550 by the custom consumer application 540 and the queue is bypassed. In operation 8, the inference result is read by a custom consumer application that inspects the inference result to determine whether the data object is to be sent to another AI inference model. In this example, in operation 9, the data object is read from the data source 510, 512, 514 and sent to an inference engine that includes AI inference model 2. Alternatively, the data object may be stored in a scratch space rather than read from the data source each time until it is determined that all inference processing has taken place. In operation 10, the inference result is put into the queue. In operation 11, the inference result is read from the queue and put into the database table 550. Note, the custom consumer application 540 may continue to read the inference result to build out a multi-layered cascaded inference strategy. The database table 550 may be described as an index or a catalog that may be used to respond to a search request that references the inference label and/or accuracy.

Figure 6:
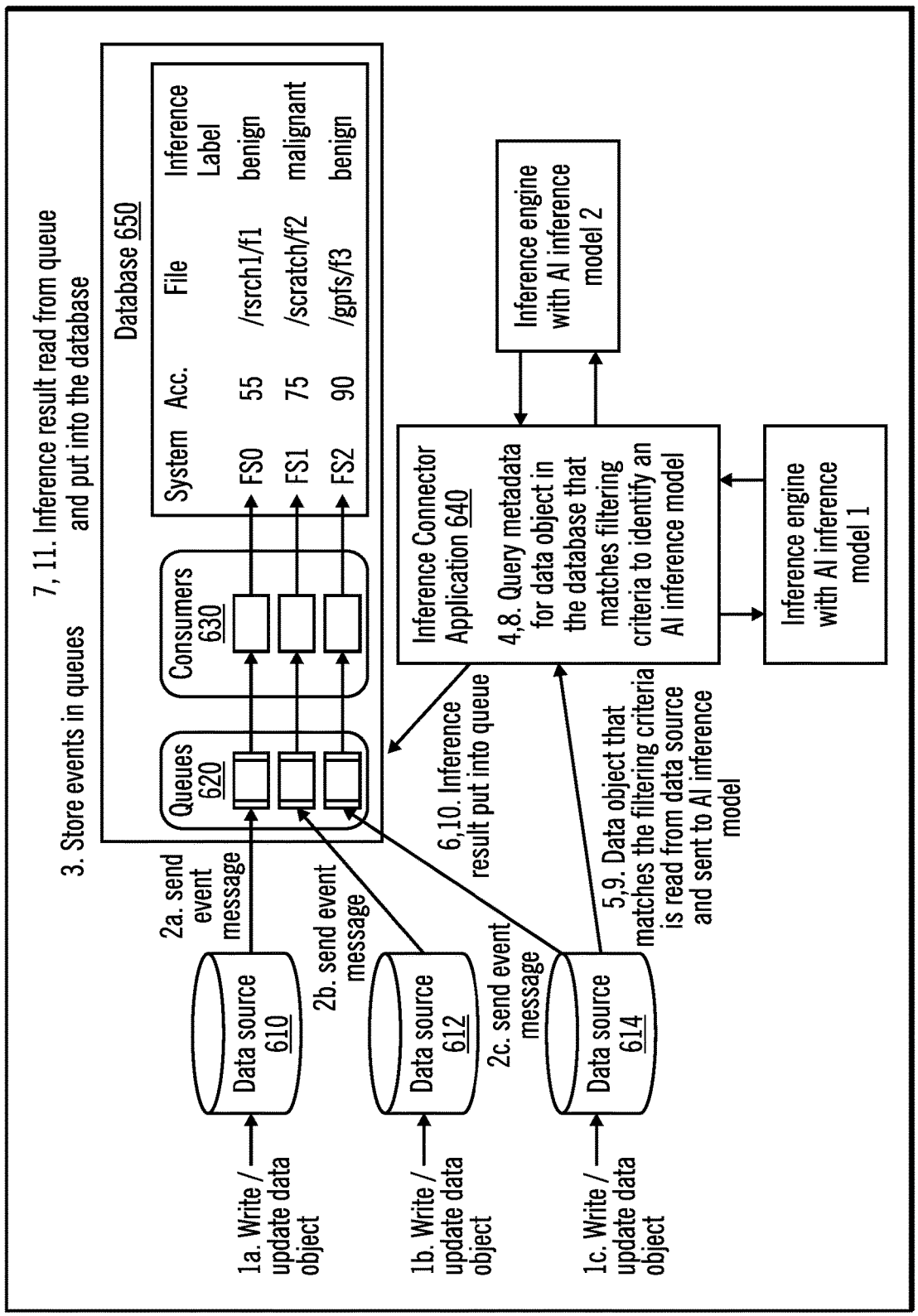
FIG. 6 illustrates automated inference label indexing with a database query in accordance with certain embodiments.

FIG. 6 illustrates automated inference label indexing with a database query in accordance with certain embodiments. In certain embodiments, with reference to FIG. 6, in operation 1, applications or users update (e.g., write) data objects (e.g., files or other objects) to file systems of data sources 610, 612, 614 that store the data objects. In operation 2, the storage systems send event messages containing the metadata about the data objects. These event messages are put onto persistent message queues 620, and consumers 630 read the event messages from the queues 620, normalize the event messages, and insert the content of the event messages into a database table 650 (operation 3). In operation 4, an inference connector application 640 queries the database 550 to match metadata, for a data object, in the database records to filtering criteria, which is matched to an inference policy that identifies an AI inference model.

If the filtering criteria is met by a database record, the data object for that database record is read from the data source and sent to an inference engine that includes an AI inference model (identified by the inference policy). In this example, the filtering criteria is met, and the inference connector application 640 reads the data object from the data source and sends the data object to an inference engine that includes AI inference model 1 in operation 5, and the inference result is put onto a queue in operation 6. In this example, the inference result is an inference label and an accuracy of that inference label. The queue may be the same queue that stored the event message that was read.

In operation 7, the inference result is read from the queue and inserted into the database 650. In alternative embodiments, the inference result may be directly inserted into the database by the inference connector application 640 and the queue is bypassed. In operation 8, the database 650 is again queried by the inference connector application 640 to analyze the inference result to determine whether the data object is to be sent to another AI inference model. If this is the case, in operation 9, the data object is read from the data source 610, 612, 614 and sent to an inference engine that includes AI inference model 2. Alternatively, the data object may be stored in a scratch space rather than read from the data source each time until it is determined that all inference processing has taken place. In operation 10, the inference result is put into the queue. In operation 11, the inference result is read from the queue and put into the database 650. Note, the inference connector application 640 may continue to read the inference result to build out a multi-layered cascaded inference strategy. The database table 550 may be described as an index or a catalog that may be used to respond to a search request that references the inference label and/or accuracy.

Figure 7:
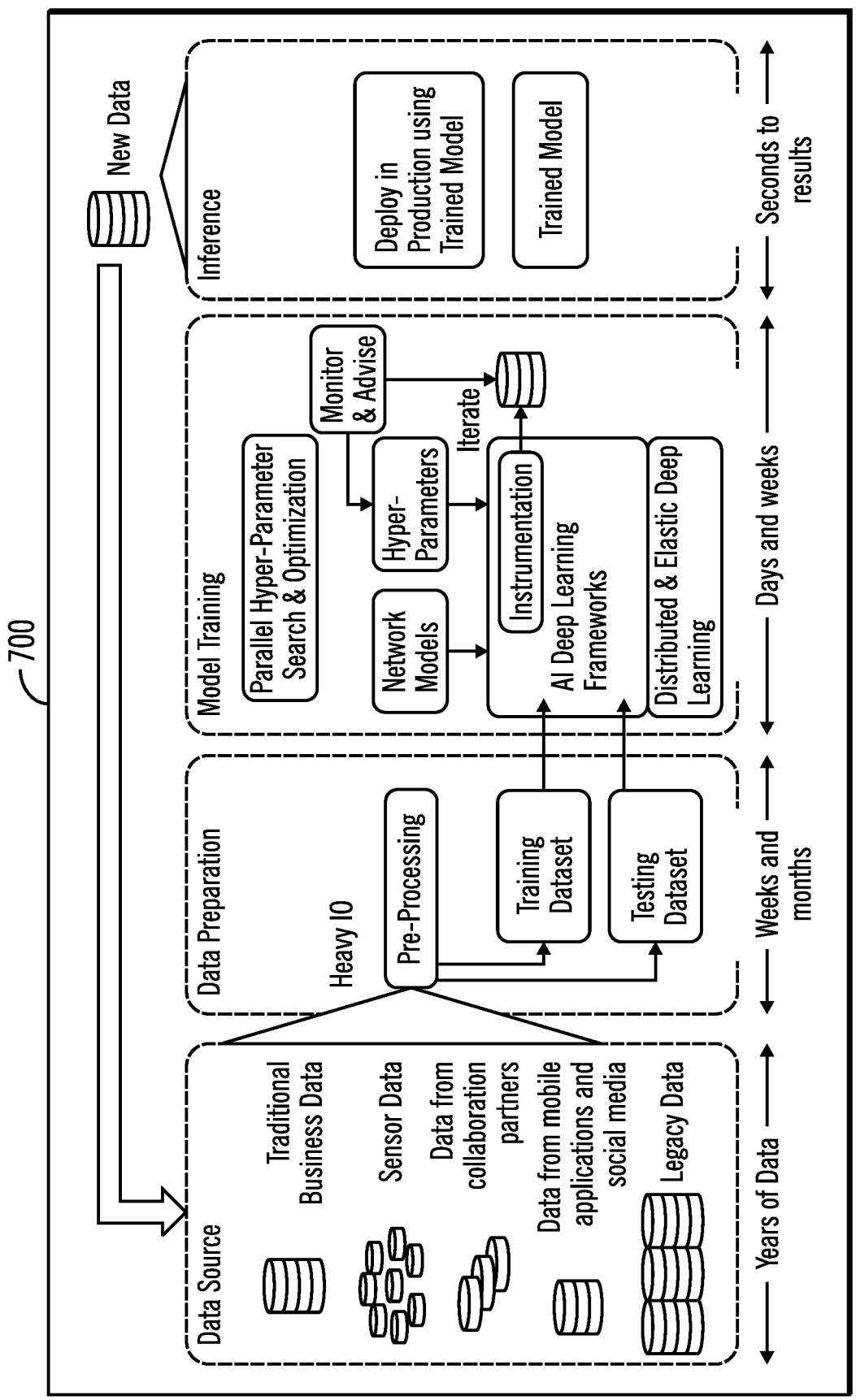
FIG. 7 illustrates an AI pipeline flow in accordance with certain embodiments.

FIG. 7 illustrates an AI pipeline flow 700 in accordance with certain embodiments. In FIG. 7, data from different data sources is pre-processed to form training datasets for use in training AI inference models. The model training includes parallel hyper-parameter search and optimization using AI deep learning frameworks and distributed and elastic deep learning. Then, the AI inference models are deployed in production.

Figure 8A:
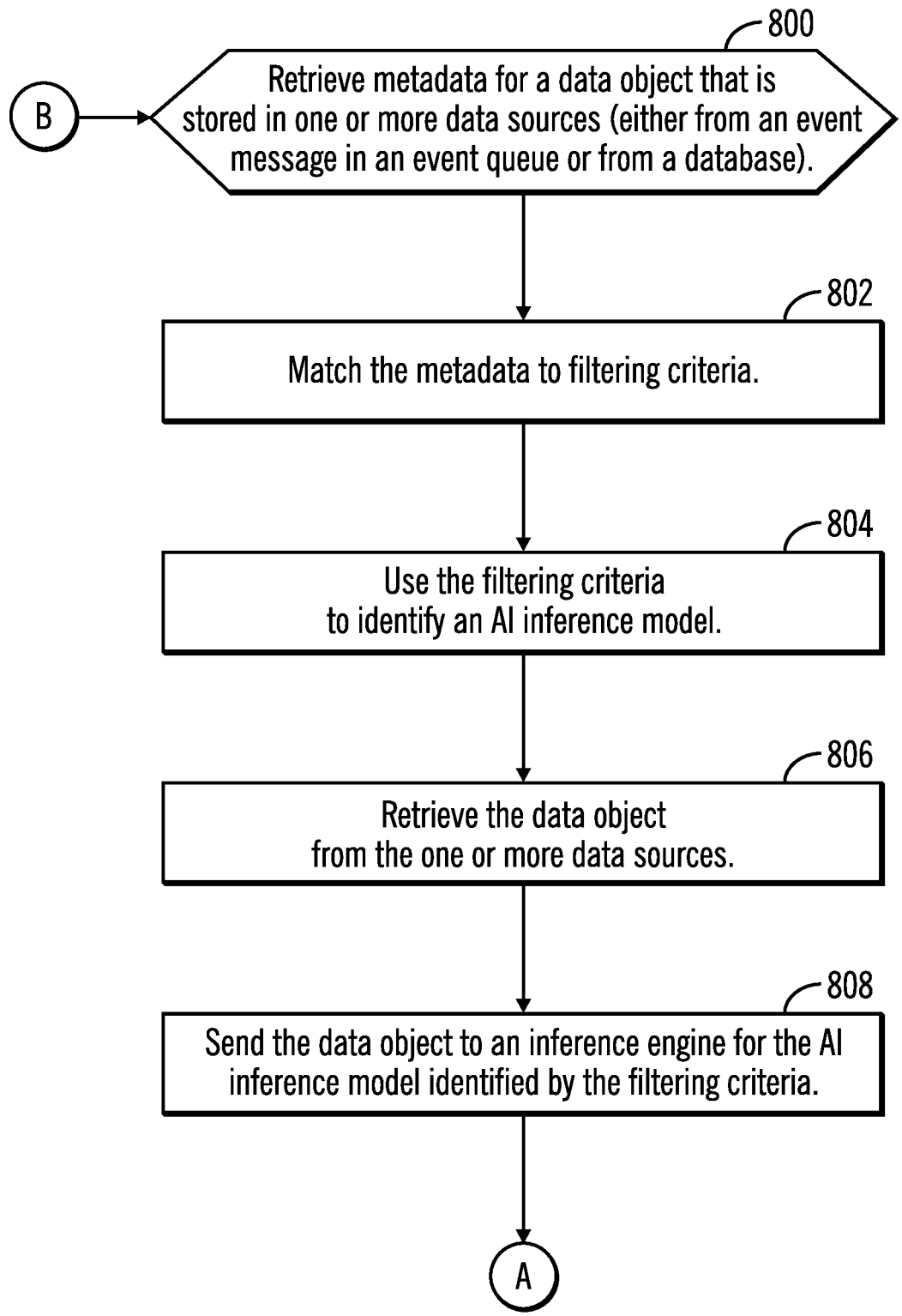
FIGS. 8A and 8B illustrate, in a flowchart, operations for inference labeling accordance with certain embodiments.
Figure 8B:
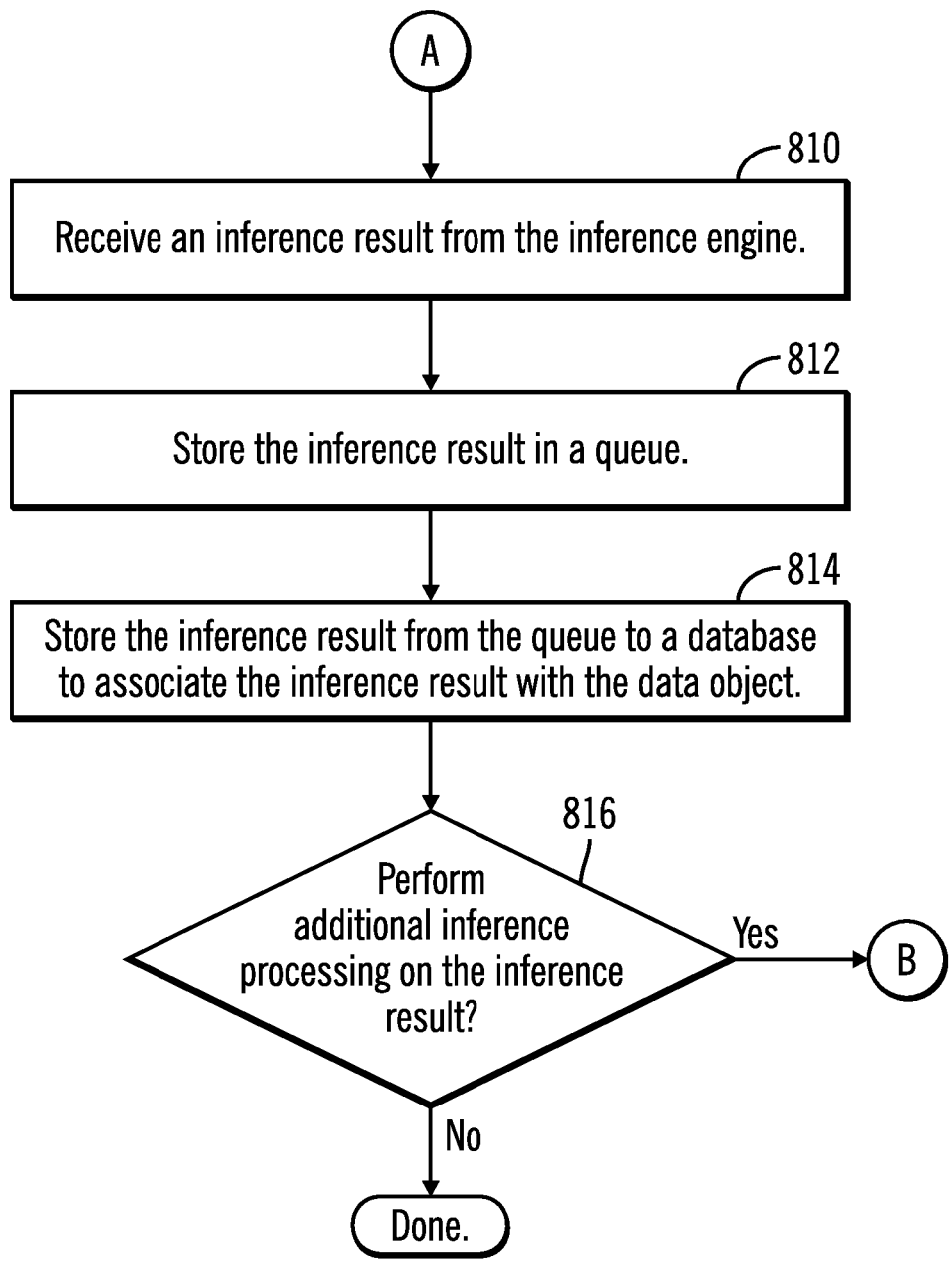

FIGS. 8A and 8B illustrate, in a flowchart, operations for inference labeling accordance with certain embodiments. Control begins at block 800 with the indexing engine 160 (i.e., with either the custom consumer application 162 or as an inference connector application 164) retrieving metadata for a data object that is stored in one or more data sources. In certain embodiments, the metadata is retrieved (either from an event message in an event queue by the custom consumer application 162 or from a database by the inference connector application 164. The data object may be a file that is stored across multiple data sources. In block 802, the indexing engine 160 matches the metadata to filtering criteria. In block 804, the indexing engine 160 uses the filtering criteria to identify an AI inference model. In certain embodiments, the filtering criteria is matched to an inference policy that identifies the AI inference model. In block 806, the indexing engine retrieves the data object from the one or more data sources. In block 808, the indexing engine 160 sends the data object to an inference engine for the AI inference model identified by the filtering criteria. From block 808 (FIG. 8A), processing continues to block 810 (FIG. 8B).

In certain embodiments, the inference engine inputs the data object to the AI inference model, which outputs an inference result, and the inference engine returns the inference result.

In block 810, the indexing engine 160 receives an inference result from the inference engine. In certain embodiments, the inference result includes an inference label and an accuracy for the inference label. In block 812, the indexing engine 160 stores the inference result in a queue. In block 814, the indexing engine 160 stores (e.g., moves or copies) the inference result from the queue to a database to associate the inference result with the data object. In block 816, the indexing engine 160 determines whether to perform additional inference processing on the inference result. If additional inference processing is to be performed, processing continues to block 800 (to retrieve the metadata (which is the inference result at this point) from the queue or the database), otherwise, processing is done.

In certain embodiments, the processing of blocks 800-816 is performed for metadata in each event message or each database record. In certain embodiments, some metadata may not match to any filtering criteria, and no inference result is generated for that metadata.

Figure 9:
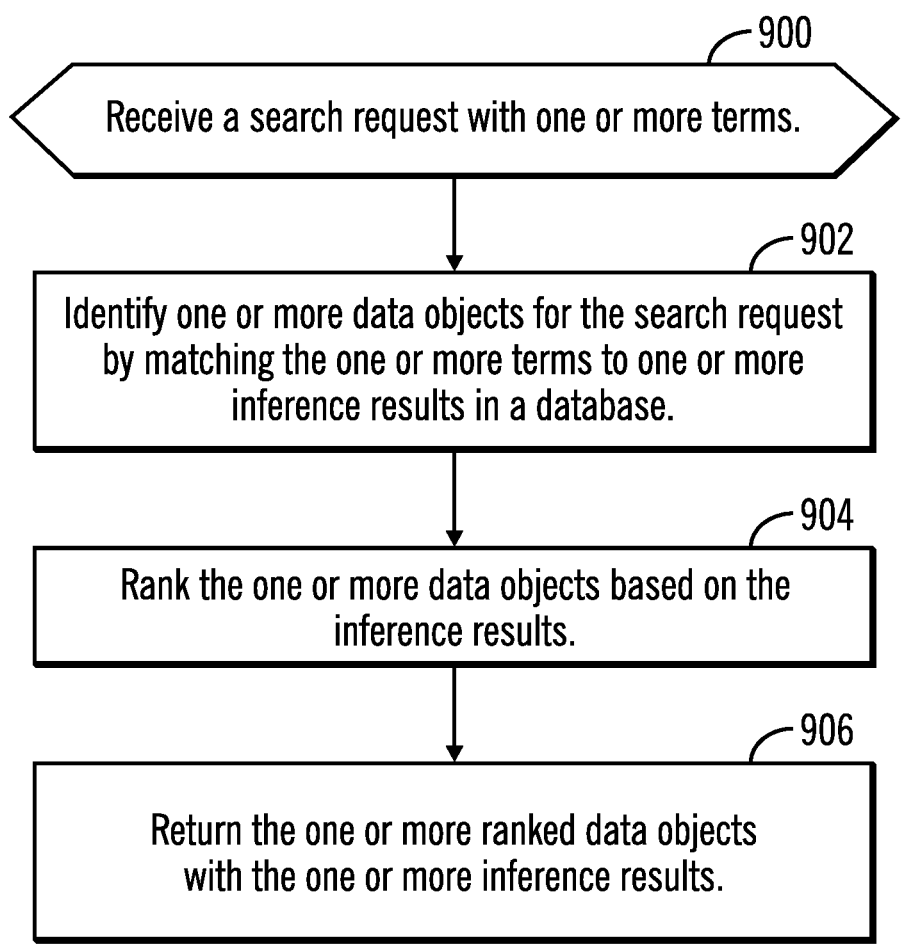
FIG. 9 illustrates, in a flowchart, operations for processing a search request using inference labels accordance with certain embodiments.

FIG. 9 illustrates, in a flowchart, operations for processing a search request using inference labels accordance with certain embodiments. In block 900, control begins with the search engine 170 receiving a search request with one or more terms. In block 902, the search engine 170 identifies one or more data objects for the search request by matching the one or more terms to one or more inference results in a database. In certain embodiments, the inference results include inference labels and accuracies, and the one or more terms are matched to the inference labels. The inference labels in the database were generated by AI inference models, along with accuracies of the inference labels. In block 904, the search engine 170 ranks the one or more data objects based on the inference results. In certain embodiments, the ranking is based on accuracies associated with the inference labels. In block 906, the search engine 170 returns the one or more ranked data objects with the inference results (e.g., with one or more inference labels, and with one or more accuracies for the one or more inference labels). The one or more ranked data objects may be provided as a list with the inference results for each data object shown next to the data object.

When building large scale, production AI pipelines, embodiments allow customers to understand what data they are ingesting, understand how to process the data with one or more inference engines, and to store the results of the inferencing in an easily searchable and organizable manner, including capturing the accuracy of the inference. In addition, embodiments allow customers to capture the provenance of the inference in order to defend the results and avoid bias claims. Moreover, embodiments allow customers to leverage the inferencing results to identify datasets that need to be retrained and leverage the inference result to build additional, automated inference processing.

Embodiments provide an event-based technique for ingesting, cataloging, and discovering a new or a modified data object. Embodiments filter the metadata of the new or modified data object to one or more inference policies to determine candidacy for sending the data object to one or more inference engines. Embodiments resolve the location of the filtered candidate data object, reading the data object from one or more data sources, and passing data to the AI inference model. Embodiments capture the results of the AI inference model as an inference label with an associated accuracy of the inference result and provenance (such as the inference engine version) and name. Embodiments insert the inference label into an easily searchable catalog (e.g., a database table) where the results are stored as one or more system and/or custom metadata tags. Embodiments support cascading inferencing based on results of upstream inferencing.

Merely to enhance understanding, an example with reference to cancer is provided. First, filtering criteria would identify whether each data object is high quality (e.g., 400× magnification). Then, each data object that is high quality is passed to a high quality AI inference model to determine the tumor class (e.g., malignant or benign). Then, each data object having a tumor class of malignant is passed onto another AI inference model for additional inferencing.

In certain embodiments, the inference labeling is done transparent to applications that interface directly with the data sources. That is, data objects may be ingested rapidly into one or more storage systems using industry standard protocols with no performance or scalability issues.

Figure 10:
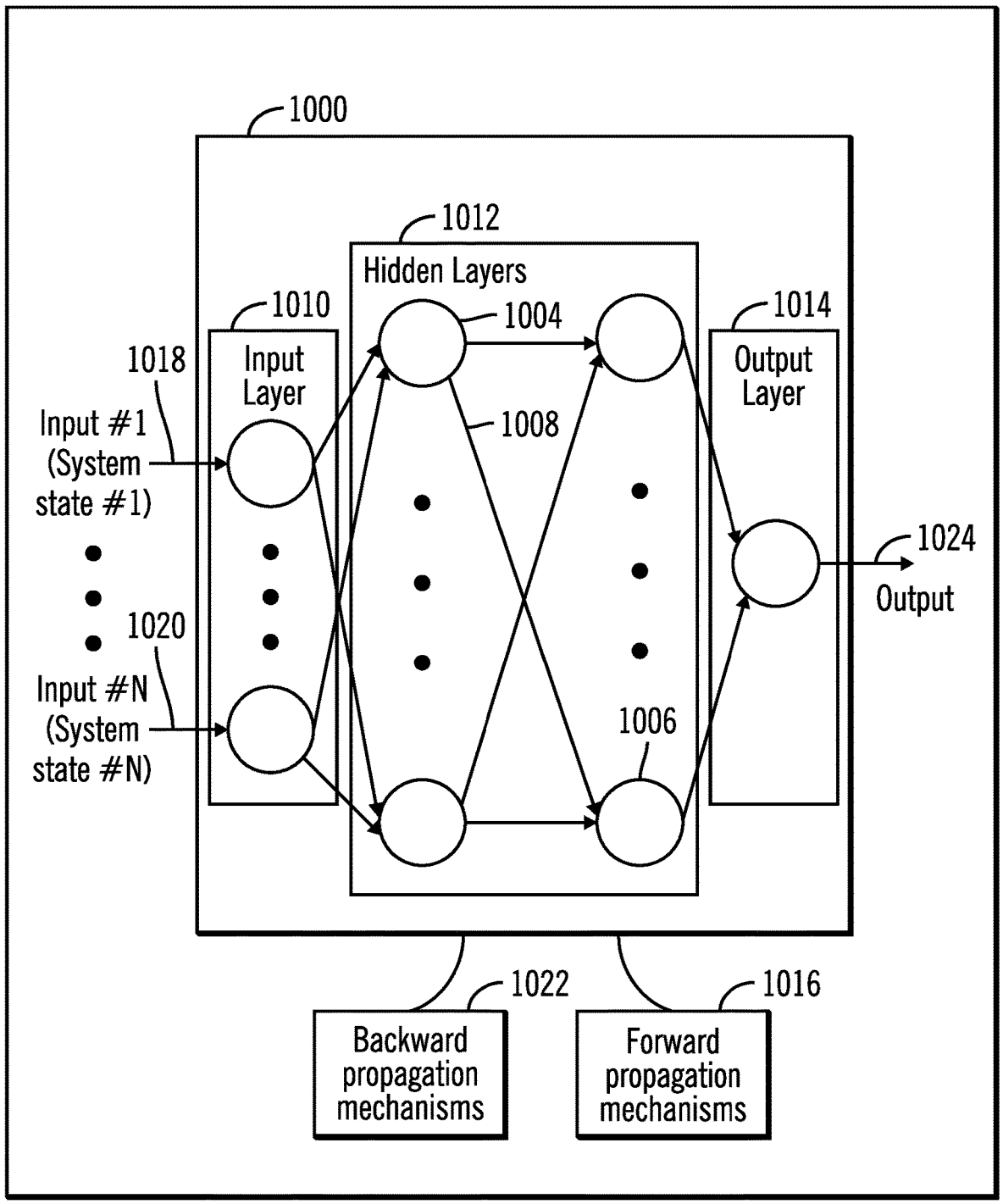
FIG. 10 illustrates, in a block diagram, details of a machine learning module 1000 in accordance with certain embodiments.

FIG. 10 illustrates, in a block diagram, details of a machine learning module 1000 in accordance with certain embodiments. In certain embodiments, the one or more AI inference models 152b . . . 152p are implemented using the components of the machine learning module 1000.

The machine learning module 1000 may comprise a neural network with a collection of nodes with links connecting them, where the links are referred to as connections. For example, FIG. 10 shows a node 1004 connected by a connection 1008 to the node 1006. The collection of nodes may be organized into three main parts: an input layer 1010, one or more hidden layers 1012, and an output layer 1014.

The connection between one node and another is represented by a number called a weight, where the weight may be either positive (if one node excites another) or negative (if one node suppresses or inhibits another). Training the machine learning module 1000 entails calibrating the weights in the machine learning module 1000 via mechanisms referred to as forward propagation 1016 and backward propagation 1022. Bias nodes that are not connected to any previous layer may also be maintained in the machine learning module 1000. A bias may be described as an extra input of 1 with a weight attached to it for a node.

In forward propagation 1016, a set of weights are applied to the input data 1018 . . . 1020 to calculate the output 1024. For the first forward propagation, the set of weights may be selected randomly or set by, for example, a system administrator. That is, in the forward propagation 1016, embodiments apply a set of weights to the input data 1018 . . . 1020 and calculate an output 1024.

In backward propagation 1022 a measurement is made for a margin of error of the output 1024, and the weights are adjusted to decrease the error. Backward propagation 1022 compares the output that the machine learning module 1000 produces with the output that the machine learning module 1000 was meant to produce, and uses the difference between them to modify the weights of the connections between the nodes of the machine learning module 1000, starting from the output layer 1014 through the hidden layers 1012 to the input layer 1010, i.e., going backward in the machine learning module 1000. In time, backward propagation 1022 causes the machine learning module 1000 to learn, reducing the difference between actual and intended output to the point where the two come very close or coincide.

The machine learning module 1000 may be trained using backward propagation to adjust weights at nodes in a hidden layer to produce adjusted output values based on the provided inputs 1018 . . . 1020. A margin of error may be determined with respect to the actual output 1024 from the machine learning module 1000 and an expected output to train the machine learning module 1000 to produce the desired output value based on a calculated expected output. In backward propagation, the margin of error of the output may be measured and the weights at nodes in the hidden layers 1012 may be adjusted accordingly to decrease the error.

Backward propagation may comprise a technique for supervised learning of artificial neural networks using gradient descent. Given an artificial neural network and an error function, the technique may calculate the gradient of the error function with respect to the artificial neural network's weights.

Thus, the machine learning module 1000 is configured to repeat both forward and backward propagation until the weights of the machine learning module 1000 are calibrated to accurately predict an output.

The machine learning module 1000 implements a machine learning technique such as decision tree learning, association rule learning, artificial neural network, inductive programming logic, support vector machines, Bayesian models, etc., to determine the output value 1024.

In certain machine learning module 1000 implementations, weights in a hidden layer of nodes may be assigned to these inputs to indicate their predictive quality in relation to other of the inputs based on training to reach the output value 1024.

With embodiments, the machine learning module 1000 is a neural network, which may be described as a collection of "neurons" with "synapses" connecting them.

With embodiments, there may be multiple hidden layers 1012, with the term "deep" learning implying multiple hidden layers. Hidden layers 1012 may be useful when the neural network has to make sense of something complicated, contextual, or non-obvious, such as image recognition. The term "deep" learning comes from having many hidden layers. These layers are known as "hidden", since they are not visible as a network output.

In certain embodiments, training a neural network may be described as calibrating all of the "weights" by repeating the forward propagation 1016 and the backward propagation 1022.

In backward propagation 1022, embodiments measure the margin of error of the output and adjust the weights accordingly to decrease the error.

Neural networks repeat both forward and backward propagation until the weights are calibrated to accurately predict the output 1024.

In certain embodiments, the input to the machine learning module 1000 is a data object, and the outputs of the machine learning module 1000 are one or more inference results (e.g., inference labels and associated one or more accuracies). In certain embodiments, the machine learning model may be refined based on whether the outputted recommendations, once taken, generate positive outcomes.

Figure 11:
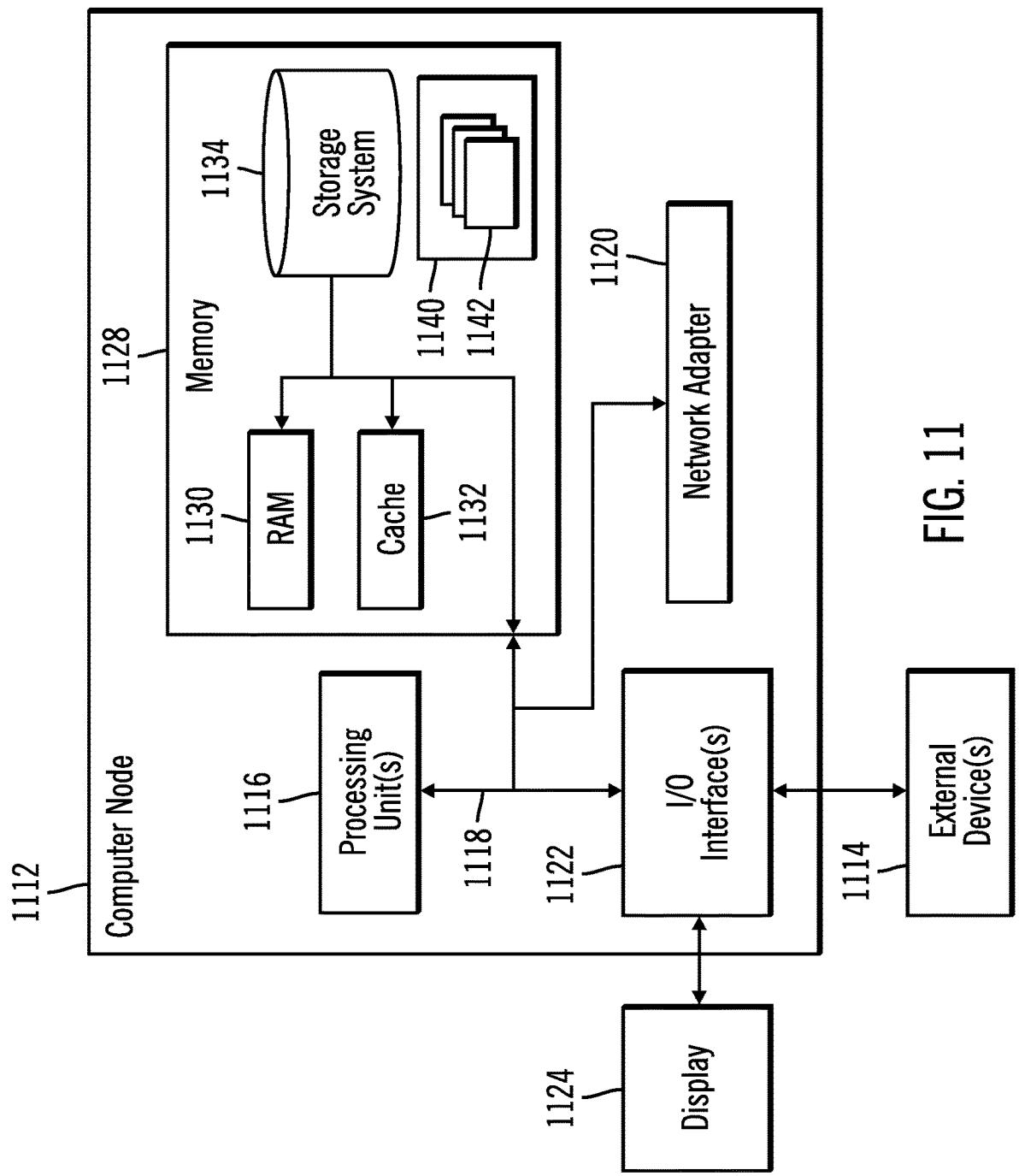
FIG. 11 illustrates a computing environment in accordance with certain embodiments.

FIG. 11 illustrates a computing environment in accordance with certain embodiments. Referring to FIG. 11, computer system 1112 is only one example of a suitable computing system and is not intended to suggest any limitation as to the scope of use or functionality of embodiments of the invention described herein. Regardless, computer system 1112 is capable of being implemented and/or performing any of the functionality set forth hereinabove.

The computer system 1112 may be a computer system, which is operational with numerous other general purpose or special purpose computing system environments or configurations. Examples of well-known computing systems, environments, and/or configurations that may be suitable for use with computer system 1112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 1112 may be described in the general context of computer system executable instructions, such as program modules, being executed by a computer system. Generally, program modules may include routines, programs, objects, components, logic, data structures, and so on that perform particular tasks or implement particular abstract data types. Computer system 1112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system 1112 is shown in the form of a general-purpose computing device. The components of computer system 1112 may include, but are not limited to, one or more processors or processing units 1116, a system memory 1128, and a bus 1118 that couples various system components including system memory 1128 to one or more processors or processing units 1116.

Bus 1118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 1112 typically includes a variety of computer system readable media. Such media may be any available media that is accessible by computer system 1112, and it includes both volatile and non-volatile media, removable and non-removable media.

System memory 1128 can include computer system readable media in the form of volatile memory, such as random access memory (RAM) 1130 and/or cache memory 1132. Computer system 1112 may further include other removable/non-removable, volatile/non-volatile computer system storage media. By way of example only, storage system 1134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a compact disc read-only memory (CD-ROM), digital versatile disk read-only memory (DVD-ROM) or other optical media can be provided. In such instances, each can be connected to bus 1118 by one or more data media interfaces. As will be further depicted and described below, system memory 1128 may include at least one program product having a set (e.g., at least one) of program modules that are configured to carry out the functions of embodiments of the invention.

Program/utility 1140, having a set (at least one) of program modules 1142, may be stored in system memory 1128 by way of example, and not limitation, as well as an operating system, one or more application programs, other program modules, and program data. Each of the operating system, one or more application programs, other program modules, and program data or some combination thereof, may include an implementation of a networking environment. Program modules 1142 generally carry out the functions and/or methodologies of embodiments of the invention as described herein.

Computer system 1112 may also communicate with one or more external devices 1114 such as a keyboard, a pointing device, a display 1124, etc.; one or more devices that enable a user to interact with computer system 1112; and/or any devices (e.g., network card, modem, etc.) that enable computer system 1112 to communicate with one or more other computing devices. Such communication can occur via Input/Output (I/O) interfaces 1122. Still yet, computer system 1112 can communicate with one or more networks such as a local area network (LAN), a general wide area network (WAN), and/or a public network (e.g., the Internet) via network adapter 1120. As depicted, network adapter 1120 communicates with the other components of computer system 1112 via bus 1118. It should be understood that although not shown, other hardware and/or software components could be used in conjunction with computer system 1112. Examples, include, but are not limited to: microcode, device drivers, redundant processing units, external disk drive arrays, Redundant Array of Inexpensive Disks (RAID) systems, tape drives, and data archival storage systems, etc.

In certain embodiments, the storage server 100 and each storage system 110a . . . 110n has the architecture of computer system 1112.

ADDITIONAL EMBODIMENT DETAILS

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

In the described embodiment, variables a, b, c, i, n, m, p, r, etc., when used with different elements may denote a same or different instance of that element.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer program product, the computer program product comprising a computer readable storage medium having program code embodied therewith, the program code executable by at least one processor to perform operations for:
   retrieving metadata for a data object that is stored in a data source wherein the metadata is retrieved from one of an event message of a queue and a database;
   matching the metadata to filtering criteria;
   using the filtering criteria to identify an Artificial Intelligence (AI) inference model;
   sending the data object to an inference engine for the AI inference model;
   receiving an inference result from the inference engine;
   storing the inference result in the database to associate the inference result with the data object; and
   in response to receiving a search request with one or more terms,
      matching the one or more terms to the inference result in the database; and
      returning the data object and the inference result.

2. The computer program product of claim 1, wherein the filtering criteria comprises an inference policy that is associated with one or more tags and with the AI inference model.

3. The computer program product of claim 1, wherein the program code is executable by the at least one processor to perform operations for:
   storing the inference result in the queue, wherein the inference result is moved from the queue to the database.

4. The computer program product of claim 1, wherein the program code is executable by the at least one processor to perform operations for:
   performing additional inference processing on the inference result to generate a new inference result that is associated with the data object.

5. The computer program product of claim 1, wherein the program code is executable by the at least one processor to perform operations for:
   identifying data objects for another search request by matching one or more other terms to inference results of the data objects;
   ranking the data objects based on the inference results; and
   returning the ranked data objects with the inference results.

6. The computer program product of claim 1, wherein the metadata is retrieved in response to the data object being updated and the event message being placed into the queue.

7. A computer system, comprising:
   one or more processors, one or more computer-readable memories and one or more computer-readable, tangible storage devices; and
   program instructions, stored on at least one of the one or more computer-readable, tangible storage devices for execution by at least one of the one or more processors via at least one of the one or more computer-readable memories, to perform operations comprising:
   retrieving metadata for a data object that is stored in a data source wherein the metadata is retrieved from one of an event message of a queue and a database;
   matching the metadata to filtering criteria;
   using the filtering criteria to identify an Artificial Intelligence (AI) inference model;
   sending the data object to an inference engine for the AI inference model;
   receiving an inference result from the inference engine;
   storing the inference result in the database to associate the inference result with the data object; and
   in response to receiving a search request with one or more terms,
      matching the one or more terms to the inference result in the database; and
      returning the data object and the inference result.

8. The computer system of claim 7, wherein the filtering criteria comprises an inference policy that is associated with one or more tags and with the AI inference model.

9. The computer system of claim 7, wherein operations further comprise:
   storing the inference result in the queue, wherein the inference result is moved from the queue to the database.

10. The computer system of claim 7, wherein operations further comprise:
   performing additional inference processing on the inference result to generate a new inference result that is associated with the data object.

11. The computer system of claim 7, wherein operations further comprise:
   identifying data objects for another search request by matching one or more other terms to inference results of the data objects;
   ranking the data objects based on the inference results; and
   returning the ranked data objects with the inference results.

12. The computer system of claim 7, wherein the metadata is retrieved in response to the data object being updated and the event message being placed into the queue.

13. A computer-implemented method, comprising operations for:
   retrieving metadata for a data object that is stored in a data source wherein the metadata is retrieved from one of an event message of a queue and a database;
   matching the metadata to filtering criteria;
   using the filtering criteria to identify an Artificial Intelligence (AI) inference model;
   sending the data object to an inference engine for the AI inference model;
   receiving an inference result from the inference engine;
   storing the inference result in the database to associate the inference result with the data object; and
   in response to receiving a search request with one or more terms,
      matching the one or more terms to the inference result in the database; and
      returning the data object and the inference result.

14. The computer-implemented method of claim 13, wherein the filtering criteria comprises an inference policy that is associated with one or more tags and with the AI inference model.

15. The computer-implemented method of claim 13, further comprising operations for:
   storing the inference result in the queue, wherein the inference result is moved from the queue to the database.

16. The computer-implemented method of claim 13, further comprising operations for:
   performing additional inference processing on the inference result to generate a new inference result that is associated with the data object.

17. The computer-implemented method of claim 13, further comprising operations for:
   identifying data objects for another search request by matching one or more other terms to inference results of the data objects;
   ranking the data objects based on the inference results; and
   returning the ranked data objects with the inference results.

* * * * *